(12) United States Patent
Li et al.

(10) Patent No.: US 11,392,835 B2
(45) Date of Patent: Jul. 19, 2022

(54) EMPLOYEE CONCIERGE

(71) Applicant: ACCENTURE GLOBAL SOLUTIONS LIMITED, Dublin (IE)

(72) Inventors: Chung-Sheng Li, San Jose, CA (US); Emmanuel Munguia Tapia, San Jose, CA (US); Guanglei Xiong, Pleasanton, CA (US); Jill K. Goldstein, Fort Lauderdale, FL (US); Jingyun Fan, Berkeley, CA (US); Rajeev Sinha, Bangalore (IN); Manoj Shroff, Bangalore (IN); Golnaz Ghasemiesfeh, Sunnyvale, CA (US); Kayhan Moharreri, San Jose, CA (US); Swati Tata, Bangalore (IN); Pratip Samanta, Bangalore (IN); Madhura Shivaram, Bangalore (IN); Akanksha Juneja, New Delhi (IN); Anshul Solanki, Gurgaon (IN); Jorjeta Jetcheva, San Jose, CA (US); Priyanka Chowdhary, San Francisco, CA (US); Rishi Vig, Bangalore (IN); Kyle Patrick Johnson, San Francisco, CA (US); Mohammad Jawad Ghorbani, Foster City, CA (US)

(73) Assignee: ACCENTUREGLOBAL SOLUTIONS LIMITED, Dublin (IE)

( * ) Notice: Subject to any disclaimer, the term of this patent is extended or adjusted under 35 U.S.C. 154(b) by 897 days.

(21) Appl. No.: 16/119,774

(22) Filed: Aug. 31, 2018

(65) Prior Publication Data
US 2020/0074311 A1 Mar. 5, 2020

(51) Int. Cl.
*G06N 5/02* (2006.01)
*G06Q 10/10* (2012.01)
(Continued)

(52) U.S. Cl.
CPC ............... *G06N 5/02* (2013.01); *G06F 16/22* (2019.01); *G06Q 10/10* (2013.01); *G06F 40/58* (2020.01)

(58) Field of Classification Search
CPC ........... G06N 5/02; G06F 16/22; G06F 40/58; G06Q 10/10; H04L 15/02
See application file for complete search history.

(56) References Cited

U.S. PATENT DOCUMENTS

| 10,708,216 B1* | 7/2020 | Rao ........................ G06Q 50/01 |
| 2002/0029161 A1* | 3/2002 | Brodersen .......... G06Q 10/1093 |
| | | 705/7.14 |

(Continued)

FOREIGN PATENT DOCUMENTS

CA 2810867 3/2012

*Primary Examiner* — Jennifer N Welch
*Assistant Examiner* — Qi Wan
(74) *Attorney, Agent, or Firm* — Mannava & Kang, P.C.

(57) ABSTRACT

Examples of employee concierge are provided. In an example, an issue may be determined for an employee. The issue may be determined based on a query shared by the employee or upon occurrence of an unusual event. The unusual event may be indicative of a deviation in behaviour and routine of the employee. A session may be initiated and the issue may be parsed to determine a context. A bot may be selected from multiple bots for the issue where each bot includes information relating to a solution to address the issue. Data associated with the issue may be collected from a central database and other bots. The data may then be analyzed to determine a solution. The solution comprises a response to the query and a suggestion to mitigate the unusual event.

15 Claims, 9 Drawing Sheets

(51) Int. Cl.
  *G06F 16/22* (2019.01)
  *G06F 40/58* (2020.01)

(56) References Cited

U.S. PATENT DOCUMENTS

| | | | |
|---|---|---|---|
| 2005/0099288 A1* | 5/2005 | Spitz | G06K 17/00 |
| | | | 340/506 |
| 2007/0190504 A1* | 8/2007 | Schwartz | G09B 5/00 |
| | | | 434/219 |
| 2010/0124911 A1* | 5/2010 | Leeder | H04L 67/22 |
| | | | 455/414.1 |
| 2011/0035674 A1* | 2/2011 | Chenoweth | G06F 16/2457 |
| | | | 715/745 |
| 2012/0154582 A1 | 6/2012 | Johnson et al. | |
| 2015/0304349 A1 | 10/2015 | Bernstein et al. | |
| 2018/0181558 A1* | 6/2018 | Emery | H04L 51/02 |
| 2019/0089655 A1* | 3/2019 | Uppala | G06Q 10/02 |

* cited by examiner

EMPLOYEE CONCIERGE

BACKGROUND

Generally, enterprises and organizations have employees working in various departments. The employees have pre-defined roles and responsibilities as per their job profiles and adhere to policies outlined by an enterprise. The policies may be related to, for example, time off taken by the employees, compensation provided to the employees, office entering and leaving times, promotion, switching departments. Employees may also be entitled to various benefits and perks depending upon their job profiles in the enterprise.

Data associated with the roles, the responsibilities, the policies, and the benefits are generally stored in databases that are updated upon a change in profile or responsibilities of the employees. For managing and handling the data, the enterprises conventionally have back end systems that record data, handle updates to the data, transfer the data, delete stale data, and add new data to the databases.

Such systems frequently receive queries and requests from the employees regarding their profile, roles and responsibilities and benefits. Generally, the systems provide response to queries based on data available and stored in the databases. As an example, upon receiving a query, the systems may raise a ticket. The query is processed by collecting information requested by the employee and provided to the employee. After completion of processing of the query and providing the response, the ticket is resolved.

However, the systems are mostly passive in operation and are activated in response to an action initiated by an employee. The systems are also inefficient in responding and addressing the queries of the employees and therefore, have decreased employee satisfaction. Further, the systems are mostly transactional in nature and fail to provide a holistic support and assistance to the employees. In addition, current systems are unable to gather and analyze employee data on a real time basis so as to proactively provide feedback and support to employees and their employers.

The present disclosure provides a technical solution to a problem to efficiently and proactively provide service to the employees of an enterprise.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
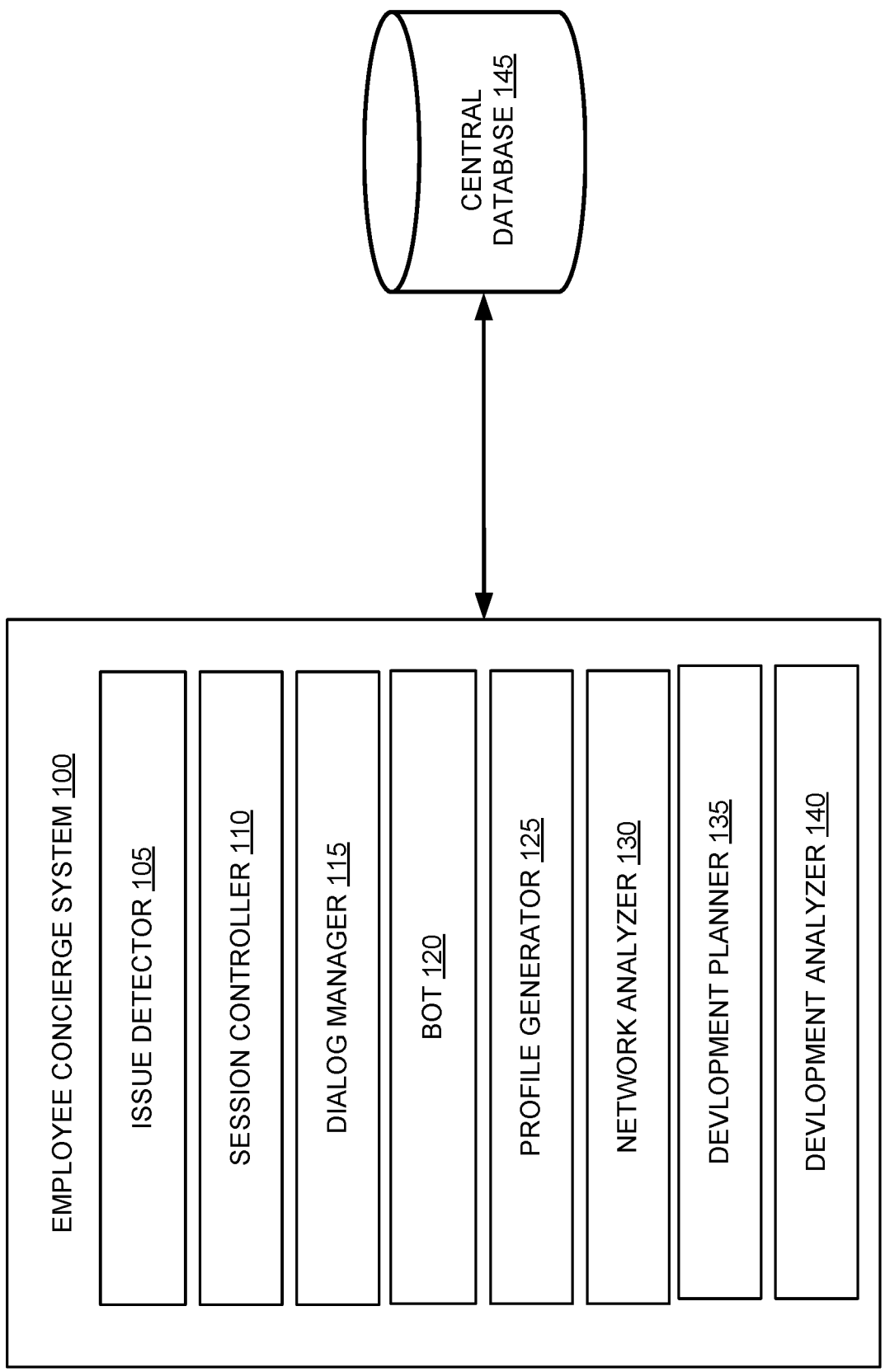
FIG. 1 illustrates various components of an employee concierge system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element and can include one or more of such elements. As used herein, the term "includes" means includes but not limited to, the term "including" means including but not limited to. The term "based on" means based at least in part on, the term "based upon" means based at least in part upon, and the term "such as" means such as but not limited to.

The present disclosure describes systems and methods for providing employee concierge services to employees of an enterprise in an efficient and proactive manner. The services may be provided by an automated system that stores data related to the employees, records updates and changes to the data and provides support for issue resolution, new employee on boarding and development and growth of the employees. The support services may be provided, for instance, upon a request or a query from an employee or upon proactive detection of an issue associated with an employee.

Employees working in an enterprise may have issues related to their profile, roles, responsibilities and their duties. For instance, an employee may have problems adjusting to roles and duties in a particular department and may want to switch to another department, or an employee plans to extend her sick leave and intends to know about the process of extending the leave. However, the process may take too long in providing a solution, and the employee may not be satisfied with the solution provided. Further, issues may not be identified proactively and the employee may have to raise such issues and wait for the issues to be addressed.

The present disclosure provides for efficient analysis of the issue and appropriate solution to the employee. Further, the present disclosure provides for proactive determination of issues and providing suggestions for such issues.

According to an aspect of the present disclosure, an issue is determined for an employee. The issue may be in a query raised by an employee. The query may be related to one of roles, responsibilities of the employee and policies of the enterprise. For instance, when the employee intends to know about the process of extending a leave, the employee may raise a query.

In an example, the issue may be determined automatically based upon a deviation in behaviour or routine of the employee from a normal routine and behaviour. The routine and behaviour of the employees may include office entering and leaving times, punctuality in attending meetings and discussions, meeting project deadlines, overall behaviour and interaction with other employees, and may be monitored and tracked on a regular basis. In a scenario, when there is a deviation from the normal routine and behaviour and the deviation exceeds a predefined threshold, an issue is detected. For example, when an employee arrives late to office for a week or regularly misses deadlines, then an issue may be detected.

After determining the issue, a session may be initiated for the employee. The session may include various processes performed for resolving the issue including collecting data from other employees, teams, and databases, fetching additional information from the employee, analyzing the data and the additional information to deduce meaningful information, and providing a solution to the employee. The session may, in one example, appear as a single integrated and uninterrupted session to the employee.

Thereafter, the issue may be parsed to determine the context and identify the type of data and information required to resolve the issue. After determining the context, a bot may be selected from amongst multiple bots for processing and resolving the issue. A bot may be a software application to perform an automated task without the need of a human agent. These tasks may include, for example, providing a response to a question from an employee and assisting employees in completing an online form. The multiple bots may be efficient in solving different issues pertaining to different contexts based on past processing and learning.

In an embodiment of the present disclosure, the bot may collect data associated with the issue from a central database, other bots, and employees of the enterprise. For example, the data may be personal information, such as name, age, date of birth, and employee ID of the employee, other information, such as department, roles and responsibilities of the employee. The data may also be related to policies and permissions granted to the employee.

The data may be analyzed to derive a solution to the issue and then provided to the employee. The solution may include a response to the query with information requested by the employee. In an example, the solution may include one or more suggestions for mitigating the unusual event.

In addition to issue resolution, the present disclosure describes techniques for new employee on boarding and talent development of employees. In an example embodiment, a profile may be generated for the new employees and roles and objectives of the new employees. Further, existing employees may be identified with similar goals and objectives who could support and mentor the new employee. In an example, the present disclosure describes generating a talent development plan for an employee and monitor and track employee development with respect to the plan. The talent development plan may further be updated based on actual development of the employee.

Thus, systems such as, for example, employee concierge systems, which use techniques consistent with the present disclosure may provide holistic support services to employees by proactively and appropriately resolving issues, onboarding new employees and developing career of the employees in a time and resource efficient manner.

FIG. 1 illustrates an employee concierge system 100 for providing support services to employees of an enterprise, according to an example implementation of the present disclosure. In an example embodiment, the employee concierge system 100, hereinafter referred to as system 100, uses a combination of Artificial Intelligence (AI) techniques, such as machine learning, data mining, and knowledge discovery, for the purpose, of providing services to the employees of the organization.

In an example, the system 100, amongst other components, includes an issue detector 105, a session controller 110, a dialog manager 115, and a bot 120. In an example, there may be multiple bots 120-1 . . . 120-n, however, for ease of reference and explanation single bot 120 has been shown. Further, the system 100 includes a profile generator 125, a network analyzer 130, a development planner 135, and a development analyzer 140. The system 100 may be communicatively coupled to a central database 145.

The system 100 provides for a continuous and proactive support services to the employees of an enterprise. In an example, the support services may be provided for issue resolution of employees, new employee onboarding, and talent development for new and current employees. Issue resolution may be performed when an employee has a query related to department, leaves, policy, roles and duties and would like to know a solution to the query. The issue may also be related to determination of deviation in normal behaviour or routine of the employee and thereafter proactively suggesting approaches to mitigate the deviation in the behaviour. In an example, the system 100 may support onboarding of new employee by identifying potential buddies and mentors in the enterprise who could aid the new employees with induction and familiarize the new employees with company policies and culture. The potential buddies and mentors may also help with career development and professional growth of the new employees. The talent development may include understanding growth objective and current status of the employee and suggest a talent development plan to aid the employee in achieving the growth plan.

In an example embodiment of the present disclosure, the issue detector 105 may receive a query from an employee regarding a request for information or about a process involved regarding an issue faced by the employee. For instance, the query may be related to extension of a leave period for an employee or for an employee desirous of changing her department. The employee, in the example, may want intend to know whether she is eligible for extension of her leave period or if she can move to another department and the respective processes involved.

In another example, the issue detector 105 may detect an unusual event based on a deviation in normal behaviour and routine of an employee. Minor changes in the routine occurring for a short period of time may be accepted by the issue detector 105 as part of normal routine. However, if the minor changes occur for an extended period of time then the change may be detected as an issue. For instance, a delay of 10-15 minutes in office reporting for 2 or 3 days may be accepted as a normal routine, however if an employee comes late to the office continuously for one to two weeks, an issue may be detected. In addition, a substantial change from the normal routine may be detected as an issue irrespective of the period. For instance, a 15-20 minutes delay in one or two investor meetings or missing one or two client deadlines may be detected as an issue by the issue detector 105. In an example the issue detector 105 may receive the information about the employee from the central database 140.

In an example, the session controller 110 may initiate a session for the issue during which the employee may interact with the system 100 and provide information associated with the issue and receive response from the system 100. During the session, the dialog manager 115 may parse the issue to determine the context of the issue. The context may pertain to a category of information requested by the employee to aid in identifying teams and other employees who could provide the requested information. For instance, if the context is about extending a leave period then Human Resource (HR) department may provide further information. The context may also allow selection of a bot to process the issue.

Thereafter, the dialog manager 115 may forward the issue to each of multiple bots 120-1 . . . 120-n. Each of the bots 120-1 . . . 120-n upon receiving the context may determine their confidence score in handling issues related to the context. The confidence score may be indicative of efficiency of the bot in resolving such issues in the past and related employee satisfaction. For instance, in case the context is Human Resources ("HR"), then the bots may determine their confidence score in resolving issues related to HR in the past. A bot may have a high confidence score of 0.97, another bot may have a confidence score of 0.85 and yet another bot may have a confidence score of 0.90 and so on. The confidence scores may then be forwarded to the dialog manager 115. The dialog manager 115, after receiving the confidence scores, may select one or more bots with higher confidence scores for processing the issue. In an example embodiment, the dialog manager 115 may select the bot 120 for processing the issue.

The bot 120 may determine if additional data is required from the employee for processing the issue. In a scenario, if it is determined that additional data is required then the bot 120 may verify whether the additional data is already available with one of other employees, other bots or the central database 145 that the employee provided during a previous session. If it is determined that the additional data is already available then the bot 120 may fetch the additional data and restore the previous session from where the previous session ended. For instance, in a previous session, the employee may have requested to register for a new telephone connection for which the employee was asked to provide name, date of birth and address along with an address proof. The employee may have provided information regarding her name, date of birth and address, but could not have provided the address proof due to unavailability. The details of the conversation with the employee, various conversation stages at which different information was shared by the employee and the context is stored in a database, such as the central database 145. In a subsequent session, the employee may have requested for the new phone connection and may have provided the address proof. The bot 120 may determine whether additional data such as name, date of birth and address is required. Upon determining that the additional data is required, the bot 120 may check whether the additional data is available in the central database 145 and fetch the additional data from the central database 145. Accordingly, the bot 120 may restore the previous session for the employee. In case the additional data is not available then the bot 120 may request the additional data from the employee.

In an example, the bot 120 may frame a question for the employee to receive the additional data. Specifically, the bot 120 may parse the content of the issue to extract entities and determine relationships between the entities. In addition, the bot 120 may extract words and terms from the content of the issue and apply a linguistic rule to the words and the terms. Thereafter, the bot 120 may generate the question to be shared with the employee to receive the additional data.

In an example, when an employee enters questions in the bot, conversational data may be parsed through a dependency parser, which may identify the relations between different words and phrases in the conversation. The entities may be noun phrases or other domain related words, for instance, HR related jargon. The relationships may be determined by verb phrases within the conversations and the words may be put together using the question generation framework and accordingly questions may be generated. The question generation framework may involve different templates of the questions based on the questioning noun phrase, such as, for example, which, what, who etc. The question noun phrases may be determined by a machine learning model.

Further, the bot 120 may frame a question to get inputs regarding missing data, when the missing data is not available within the central database 140. For example, if the missing data is about when the new address should become effective and an employee did not provide the information in an original request, the bot may need to reach out to the employee to clarify the start date.

For further processing the issue, the bot 120 may fetch data from the central database 140. In an example, the bot 120 may fetch the data from other bots which have some information related to the issue and other employees of the enterprise. Thereafter, the data collected from the central database 145, data collected from other bots and other employees, and the additional data collected from the employee may be analyzed and processed to determine a solution to the issue. The solution may include one of a response to the query and one or more suggestions to mitigate the unusual event. Thereafter, the session is ended for the employee. In an example of data analysis consider a scenario, where a new address of an employee may imply that a different state tax may be withheld as the working and resident states are different Further, the employee may also travel to other states and work outside of the country regularly. Consequently, this information may be gathered so that the proper state tax withheld from the payroll can be determined properly.

In an embodiment of the present disclosure, the system 100 may provide for smooth onboarding of new employees. In an example, the profile generator 125 may implement machine learning techniques on data collected from various data sources to generate the profiles. The data sources may be internal or external, for instance, a CV submitted while applying for a job with the organization, data collected from employee's social media pages, internal training documents, internal questionnaires, and internal assessment data.

The profile generator 125 may determine a goal and an objective for the new employee by parsing the profile of the new employee. In an example, the information related to goals and objectives may be received from the new employee when for instance, the new employee provided the information on forms and questionnaires or during interviews and then stored in the central database 145. In an example, employees of similar goals and objectives may be determined through their role, responsibilities, and career path. Similar roles, responsibilities, and career path may indicate that these employees have similar goals and objectives. The process may also be coupled with an explicit declaration by each employee and/or the understanding obtained by these employee's management and HR partners. In said example the profile generator 125 may fetch information related to goals and objectives from the central database 145.

In an example, the network analyzer 130 may identify existing employees having similar goals and objectives as that of the new employee. For instance, semantic similarity metrics among the entities in new and existing employees may be identified based on the goals. An entity matching component (not shown in figures) of the network analyzer 130 may determine the similarity between the existing and new employees.

The network analyzer 130 may analyze interactions and conversations through phone calls, chats, email and messages, social media pages, and job profiles of the existing employees to determine their goals and objectives and accordingly rank the existing employees based on similarity with the goal and objectives of the new employee. After ranking the existing employee the network analyzer 130 may determine one or more existing employees as buddies for the new employee. The one or more buddies may familiarize the new employee with policies, rules, work style and culture of the enterprise and may also aid in acquiring skills and knowledge required to be efficient in their job.

In an embodiment of the present disclosure, the development planner 135 may establish a talent development plan for the employee based on role, responsibility and career information of the employee. The information on the role, responsibility and career information may be available in the job profile of the employee and stored in the central database 145. The talent development plan may be a roadmap for professional growth and progress of the employee within the enterprise and may include, time based targets related to skills, knowledge that may be acquired by the employee.

In an example, the development analyzer 140 may collect evaluation data on development, role and responsibilities for the new employee from the central database, and other employees to determine actual growth of the employee. Based on the actual growth and the talent development plan, the development analyzer 140 may determine gaps in the development and growth of the employee. If there are gaps in the employees development then the development analyzer 140 may modify the talent development plan based on the gaps to meet with the actual growth of the employee. The working of the system 100 with respect to additional components is explained in detail with the help of an example with reference to description of FIG. 2.

Figure 2:
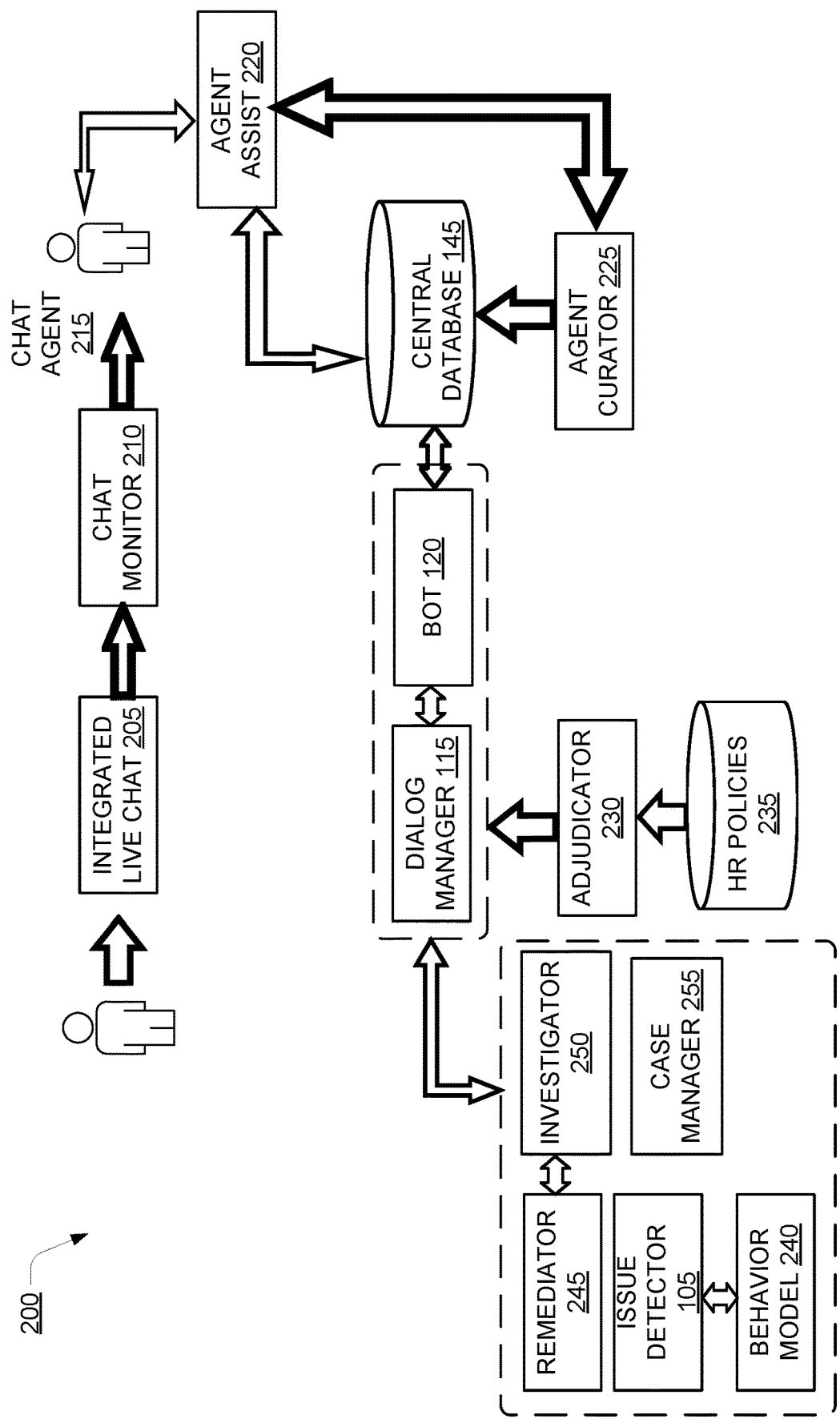
FIG. 2 illustrates an example depicting working of the components of the employee concierge system, according to an example embodiment of the present disclosure.

FIG. 2 illustrates a block diagram 200 of working of the system 100 with additional components, according to an example embodiment of the present disclosure. An employee initiates a chat with the system 100 through the integrated live chat 205. The chat is continuously monitored by the chat monitor 210 to determine if the system 100 is efficiently processing the query and is able to understand the query. In case the chat monitor 210 determines that the issue is not being processed appropriately then the chat is directed to a human chat agent 215. The chat agent 215 receives the issue and then determines appropriate action in response to the issue. In an example, the chat agent 215 need not request for the information that has already been shared by the employee. The chat agent 215 may fetch such information from the agent assist 220 which may already have fetched the information from the central database 145 and the agent curator 225.

In an example, the agent assist 220 may anticipate what an external agent, such as a human agent, might need and may prepare the appropriate context for the external agent to respond to the request. This might include the context of the question, the background of the requester, and potential relevant information that will be acquired during the course of interaction between the external agent and the requester. The agent assist 220 may also provide an environment for the external agent to conduct research on the question or request from the requester. The entire environment provided to the user directly may also be made available to the external agent.

According to example embodiment of the present disclosure, the dialog manager 115 may be regulated by an adjudicator 245 based on policies stored in HR policies 250. For instance, the dialog manager 115 may process a query related to leaves based on a leave policy stored in the HR policies 235.

The behaviour model 240 stores data associated with employee behaviour and routine, for instance, general interaction with other employees, behaviour with HR and general routine, and continuously learns from changes and modifications in employee behaviour and routine based on supervised and machine learning. In one example, the behaviour model 240 is established through an online assessment technique, such as Gallup Clifton Strengthfinder to determine strengths of employees. The issue detector 105 may monitor employee behaviour and routine through the behaviour model 240 and detect changes and unusual events occurring in the routine of the employee.

In an example, the remediator 245 may deduce possible reasons and various conditions under which the issue may have occurred. For instance, if the employee has been coming late to the office then it may be because of change of address to a place which is distant from the office or may be the employee is dropping her kid to school before coming to office. In addition, the remediator 245 may also estimate one or two remedies for the possible reasons deduced. In the example, the remediator 245 may determine a remedy that the employee be transferred to another office that is closer to the address of the employee. This may significantly reduce commute time for the employee and help the employee reach office in time. The remediator 245, as another remedy, may suggest for providing more flexibility of time and work to the employee with a remote working option that may allow more flexibility of office reporting and leaving times. The employee may also be able to devote time for office work from home.

Thereafter, the investigator 250 may verify the deductions and the remedies for validity and feasibility. The investigator 250 may fetch information from one of other employees of the enterprise, other bots and the central database 145 to verify the validity and feasibility. For instance, the investigator 250 may fetch information from manager of the employee to determine if the address of the employee has changed and whether posting the employee to a different office closer to the employee's new address may be feasible. The case manager 255 may then store the deductions and remedies for the issue for later retrieval and use.

After confirming the validity and feasibility of the deductions and the remedies, the dialog manager 115 may provide the issue to the employee along with one or more suggestions as remedy. If the employee selects a suggestion, the system 100 initiates a corresponding process to implement the suggested remedy. In an example, the employee may be requested to provide feedback related to detection of issue for the employee and remedies provided to resolve the issue. The feedback may then be utilized to enhance and improve the system performance and efficiency for subsequent sessions.

Figure 3:
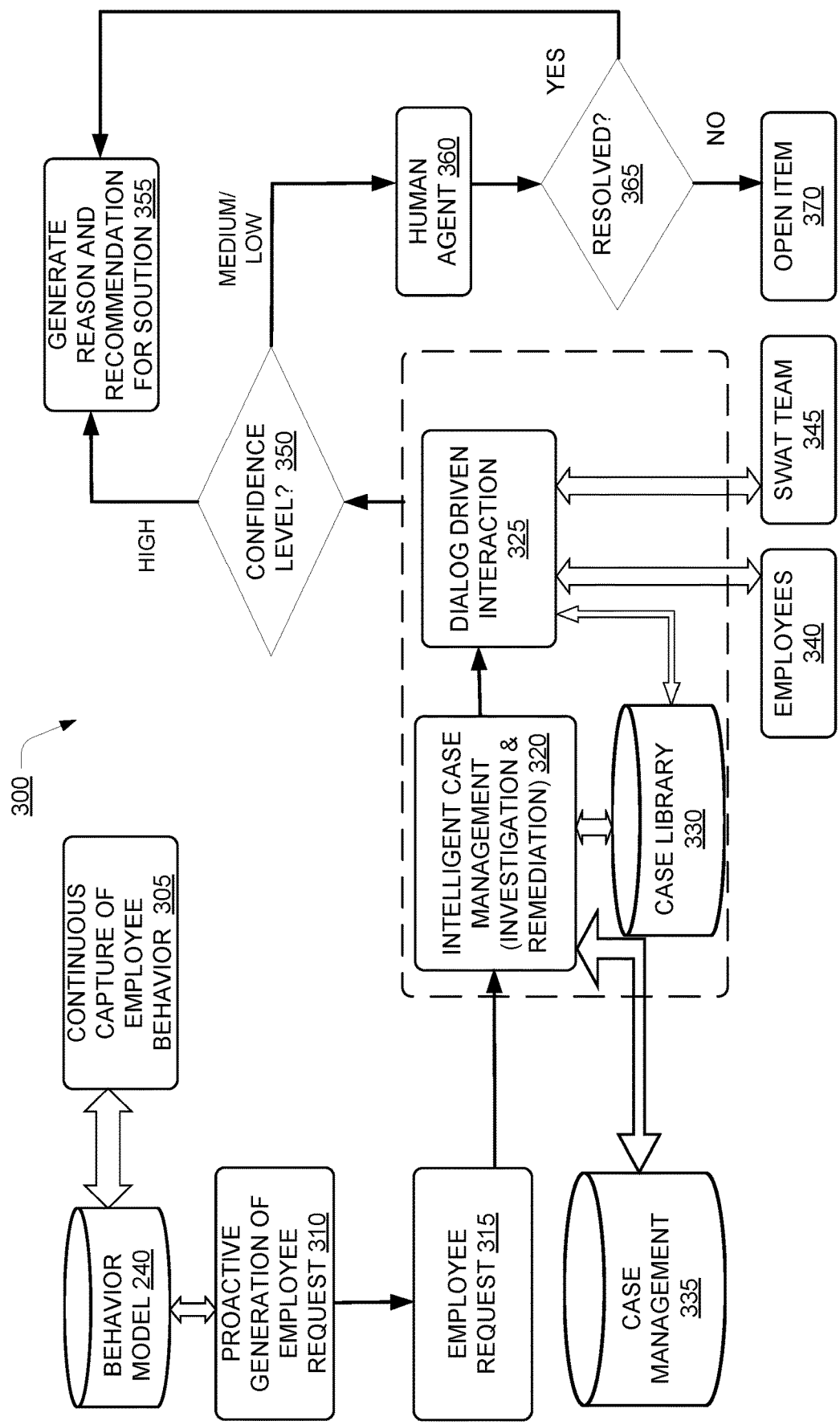
FIG. 3 illustrates an example depicting detecting an issue for the employee and resolving the issue, according to an example embodiment of the present disclosure.

The details of detecting the issue and providing suggestions to the employee are further explained in details with the help of an example with reference to description of FIG. 3.

FIG. 3 illustrates a process flow for detecting an issue and providing a suggestion to the employee, according to an embodiment of the present disclosure. Employee request may be generated proactively at block 310. In one example, the request is generated upon determining the issue based on the unusual event resulting from the deviation in the behaviour and the routine of the employee. The employee request generated is provided to intelligent case management at block 320, where the request may be investigated to determine possible reasons for the deviation in the behaviour and the routine. In addition, remedies may also be determined for the request pertaining to the issue. Information related to the request may be fetched from the case library 330. Thereafter, a dialog driven interaction may be performed at block 325. The dialog driven interaction may be performed with the other employees 340 and a swat team 345 having information about the issue and the employee. The information may be for instance related to whether the employee is actually facing the issue and whether the remedies are likely to address the issue.

In an example embodiment of the present disclosure, the confidence level of the information received from one of the other employees 340 and the swat team 345 is determined. In an example, if the confidence level is high, then a reason and a recommendation for a solution may be determined at 355. In a scenario, when the confidence level is either medium or low then the request is forwarded to a human agent at 360. In an example, if the issue is resolved after interacting with the human agent then a reason and recommendation is generated at 355, otherwise the request is kept open at 370. In an example, the open request is forwarded to the investigation and remediation.

Figure 4:
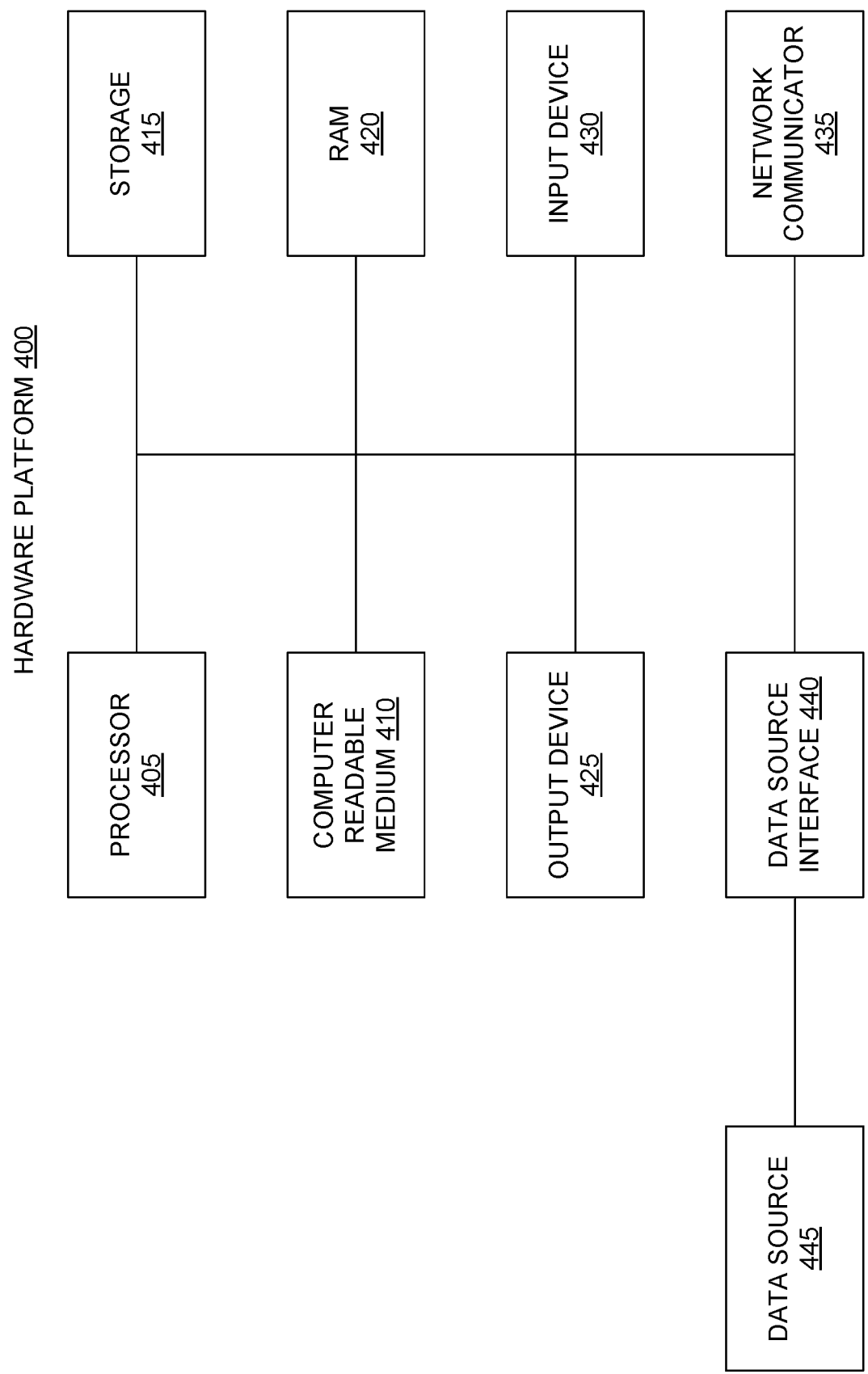
FIG. 4 illustrates a hardware platform for implementation the system, according to an example embodiment of the present disclosure.

FIG. 4 illustrates a hardware platform 400 for implementation of the system 100, according to an example embodiment of the present disclosure. Particularly, computing machines such as but not limited to internal/external server clusters, quantum computers, desktops, laptops, smartphones, tablets and wearables which may be used to execute the system 100 or may have the structure of the hardware platform 400. The hardware platform 400 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

The hardware platform 400 may be a computer system 400 that may be used with the examples described herein. The computer system 400 may represent a computational platform that includes components that may be in a server or another computer system. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 400 may include a processor 405 that executes software instructions or code stored on a non-transitory computer readable storage medium 410 to perform methods of the present disclosure. The software code includes, for example, instructions to detect an issue and forward the issue for processing, collect data from other employees and teams, analyze the data to determine a solution for the issue and provide the solution to the employee.

The instructions on the computer readable storage medium 410 are read and stored the instructions in storage 415 or in random access memory (RAM) 420. The storage 415 provides a large space for keeping static data where at least some instructions could be stored for later execution. The stored instructions may be further compiled to generate other representations of the instructions and dynamically stored in the RAM 420. The processor 405 reads instructions from the RAM 420 and performs actions as instructed.

The computer system 400 further includes an output device 425 to provide at least some of the results of the execution as output including, but not limited to, visual information to the employees about the solution and response to their query. The output device 425 can include a display on computing devices and virtual reality glasses. For example, the display can be a mobile phone screen or a laptop screen. GUIs and/or text are presented as an output on the display screen. The computer system 400 further includes input device 430 to provide a user or another device with mechanisms for entering data and/or otherwise interact with the computer system 400. The input device may include, for example, a keyboard, a keypad, a mouse, or a touchscreen. In an example, output of a bot is displayed on the output device 425. Each of these output devices 425 and input devices 430 could be joined by one or more additional peripherals.

A network communicator 435 may be provided to connect the computer system 400 to a network and in turn to other devices connected to the network including other clients, servers, data stores, and interfaces, for instance. The network communicator 435 may include, for example, a network adapter such as a LAN adapter or a wireless adapter. The computer system 400 includes a data source interface 440 to access data source 445. A data source is an information resource. As an example, a database of exceptions and rules may be a data source. Moreover, knowledge repositories and curated data may be other examples of data sources.

Figure 5:
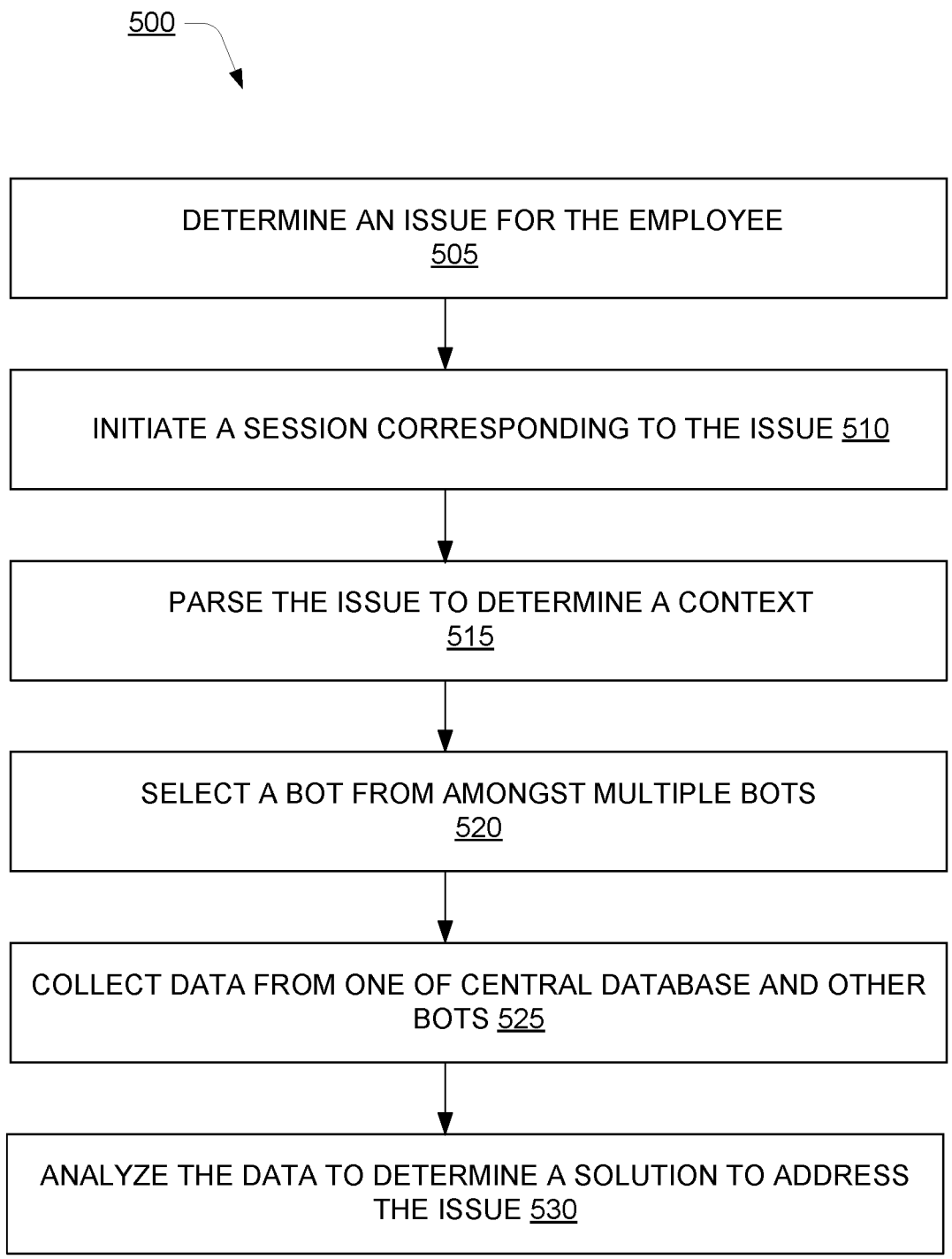
FIG. 5 illustrates a method for providing a solution to an issue of the employee, according to an example embodiment of the present disclosure.
Figure 6:
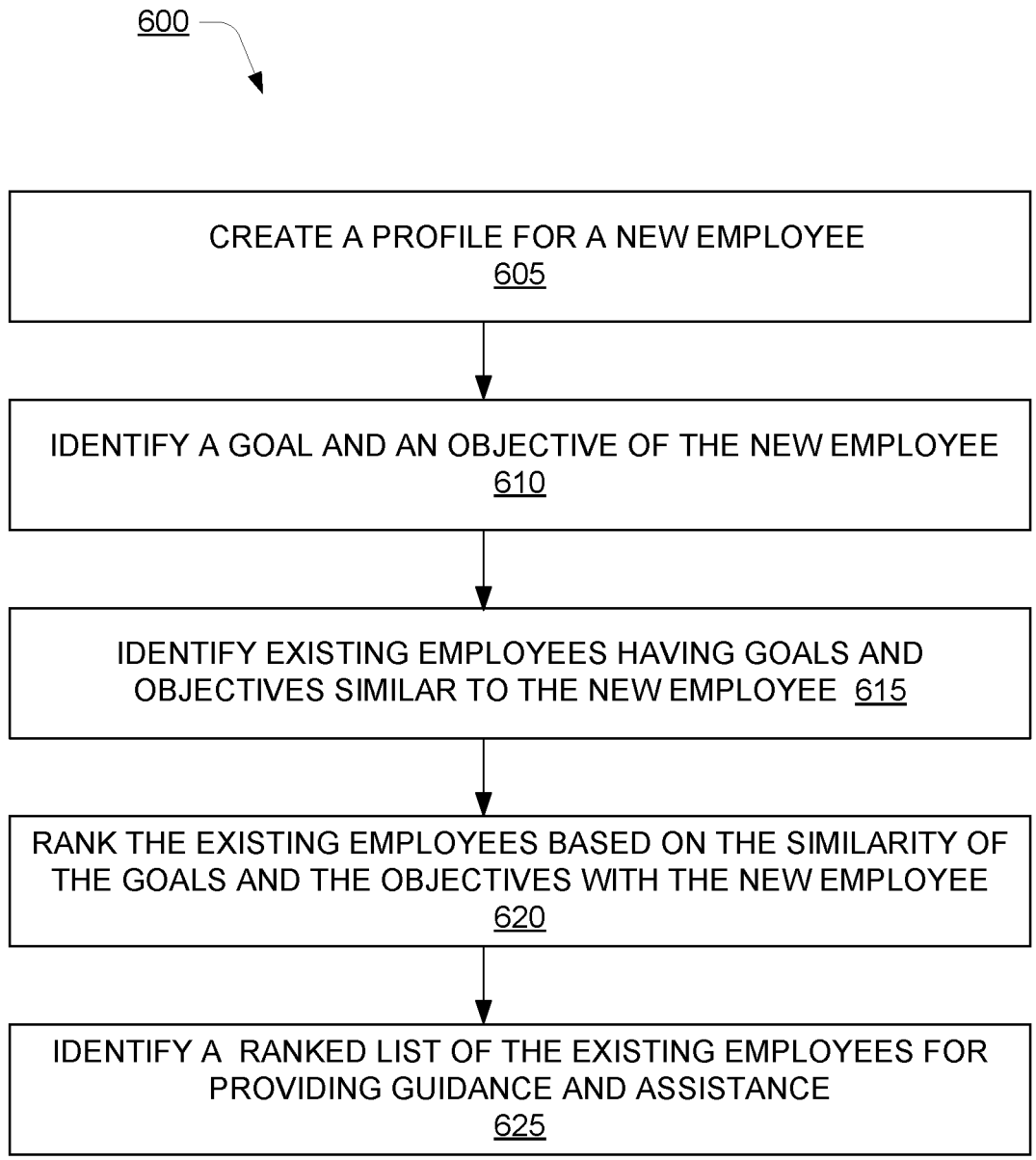
FIG. 6 illustrates a method for determining a ranked list of employees for a new employee, according to an example embodiment of the present disclosure.
Figure 7:
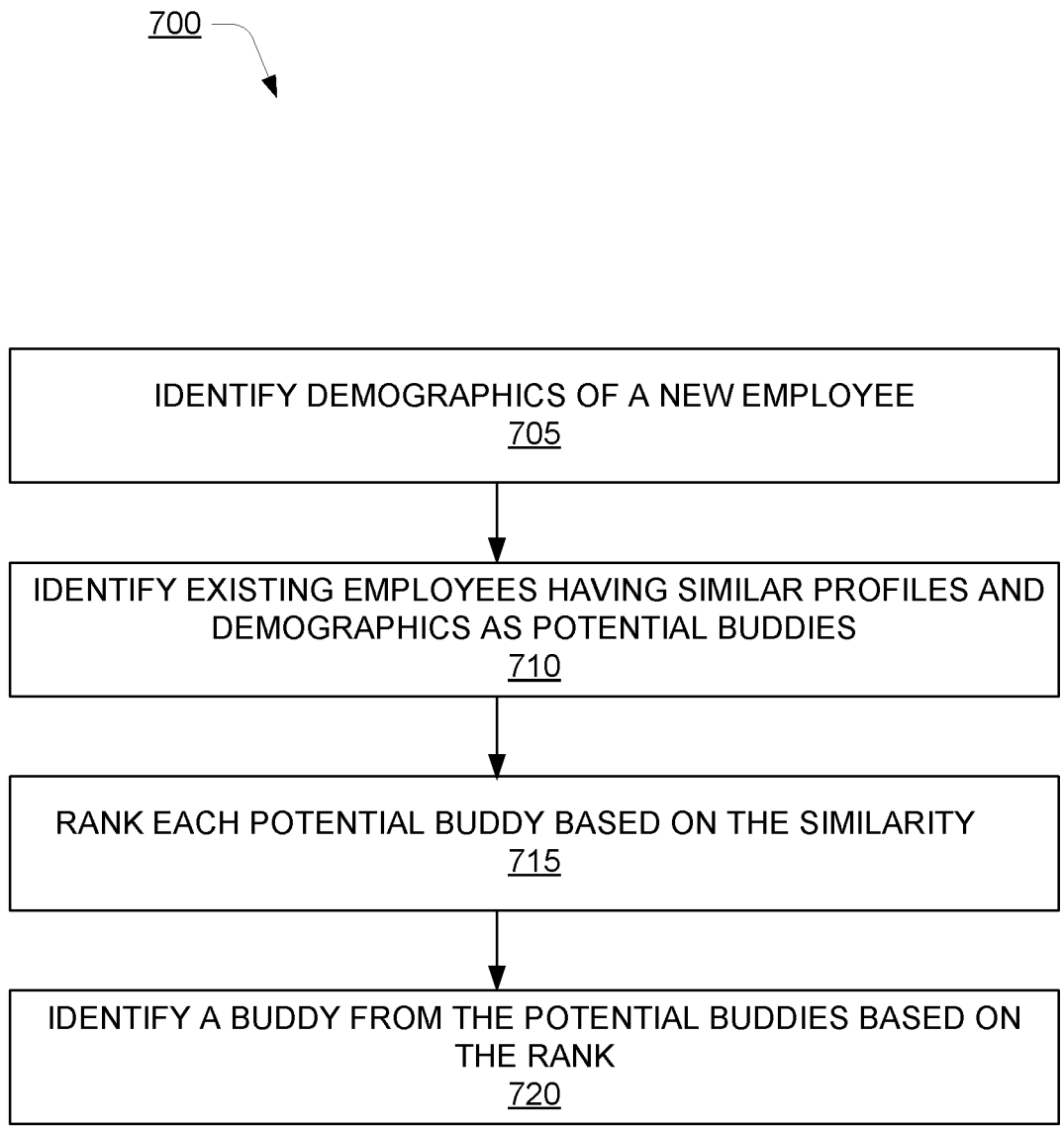
FIG. 7 illustrates a method for determining a buddy for a new employee, according to an example embodiment of the present disclosure.
Figure 8:
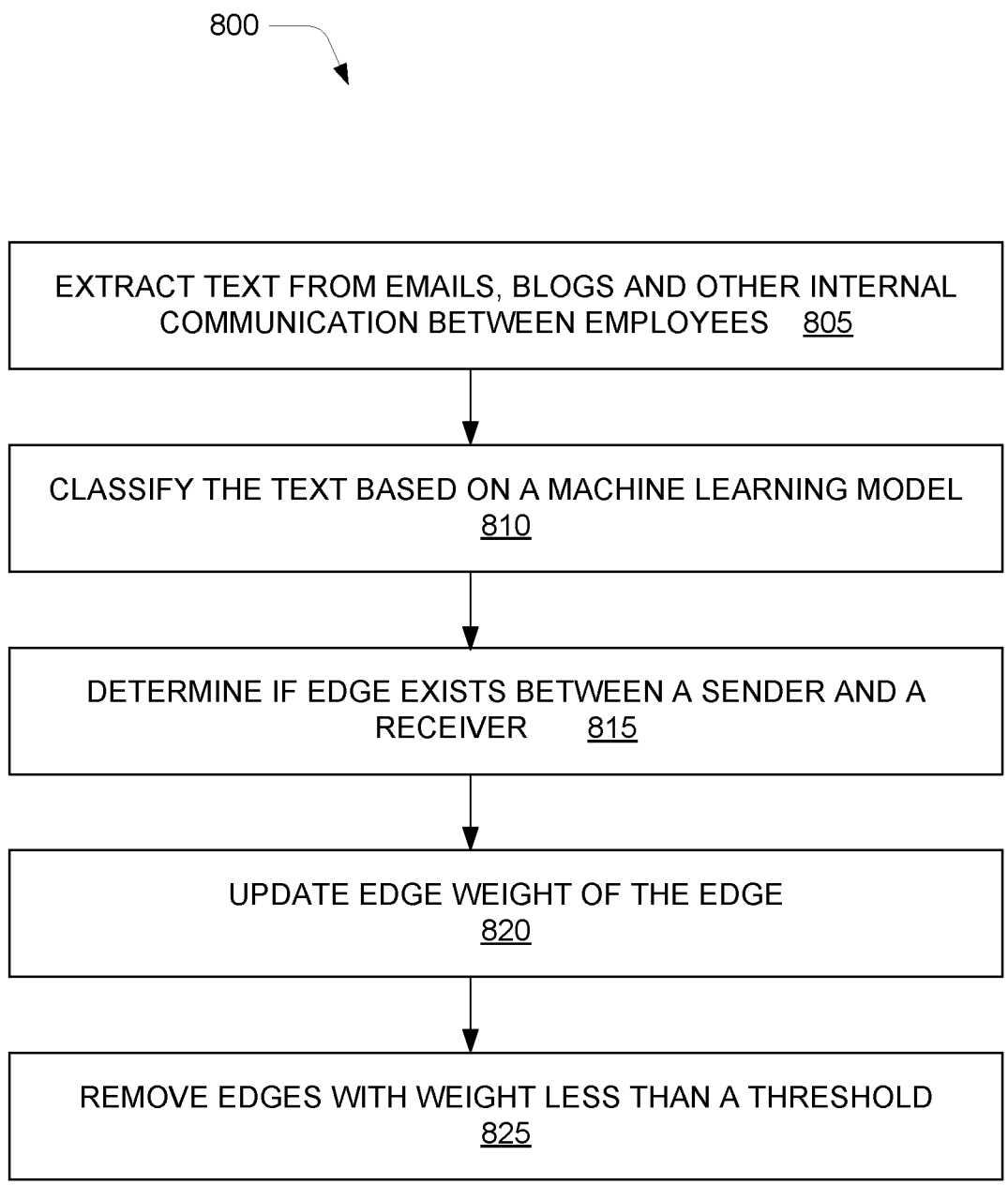
FIG. 8 illustrates a method for performing employee network analysis for the new employee, according to an example embodiment of the present disclosure.
Figure 9:
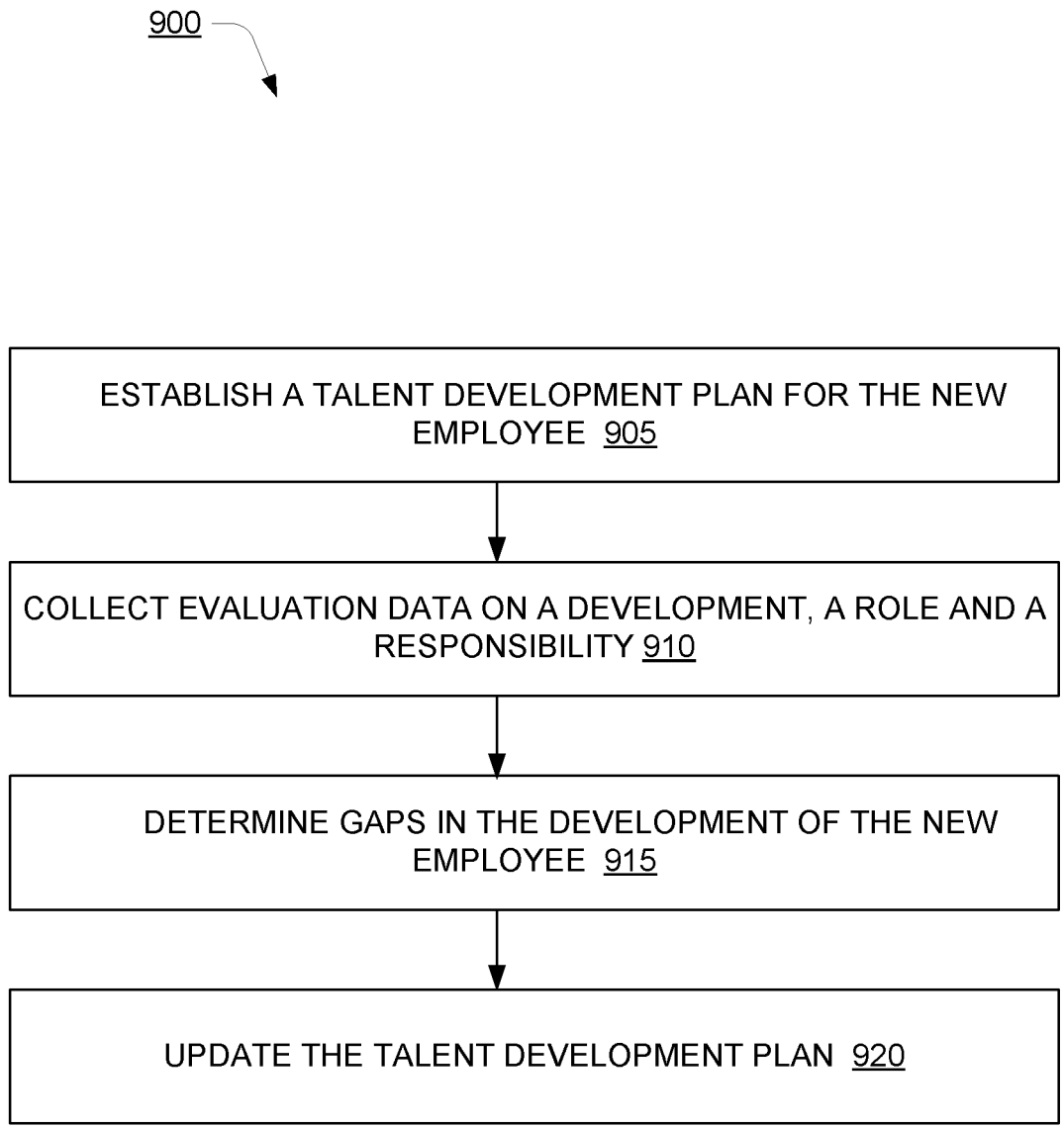
FIG. 9 illustrates a method for establishing a talent development plan for the new employee, according to an example embodiment of the present disclosure.

FIG. 5 shows a method 500 for resolving an issue for an employee, FIG. 6 shows a method 600 for determining a ranked list of employees for assistance and guidance, and FIG. 7 illustrates a method 700 for determining a buddy for a new employee for on boarding, according to the present disclosure. Further, FIG. 8 illustrates a method 800 for performing network analysis, and FIG. 9 shows a method 900 for establishing and updating a talent development plan for an employee, according to the present disclosure. It should be understood that method steps are shown here for reference only and other combination of the steps may be possible. Further, the methods 500, 600, 700, 800 and 900 may contain some steps in addition to the steps shown in the FIG. 5, FIG. 6, FIG. 7, FIG. 8, and FIG. 9 respectively. For the sake of brevity, construction and operational features of the system 100 which are explained in detail in the description of FIG. 1, FIG. 2, FIG. 3, and FIG. 4 are not explained in detail in the description of FIG. 5, FIG. 6, FIG. 7, FIG. 8 and FIG. 9. The methods 500, 600, 700, 800 and 900 may be performed by components of the system 100.

At block 505, an issue is determined for an employee. The issue may have been raised by the employee in form of a query or a request or may be automatically and proactively detected based on occurrence of an unusual event in routine and behaviour of the employee. In an example, the issue detector 105 determines the issue for the employee. The issue detector 105 may be in connection with the behaviour model 240 and may be alerted upon a deviation in behaviour and routine of the employee. At block 510, a session may be initiated corresponding to the issue. In an example, the session controller 110 may initiate the session corresponding to the issue. The session maybe initiated in a manner that irrespective of different interactions in-between the components of the system 100 and external components with number of iterations, the session may appear as a single, continuous and uninterrupted session to the employee, unless the employee selects to end the session or the session is ended abruptly or being temporarily aborted due to inactivity or unavailability of information.

At block 515, the issue is parsed to determine the context. The context may be related to the type of information requested or type of issue faced by the employee. In an example embodiment of the present disclosure, the dialog manager 115 may parse the issue to determine the context. The context may aid in determining a bot suitable for processing the issue and a department to contact for further information. For instance, if the issue is related to salary of the employee then a corresponding bot having efficiency in resolving salary related matters may be selected and the accounts department may be contacted for further information regarding the issue. Likewise, regarding an issue related to an internal policy or violation of policy, a Human Resource (HR) department may be contacted for providing further information.

At block 520, a bot may be selected from amongst multiple bots for processing the issue. In an example, the dialog manager 115 may select the bot based on confidence scores of the bots in resolving the issue. For selecting the bot, the dialog manager 115 may forward the session to each bot and then receive confidence scores of the bots in resolving issues related to the context. The dialog manager 115 may then select the bot with the highest confidence score for processing and resolving the issue.

At block 525, the data is collected from one of central database, and other bots. In an example, the bot may collect the data from the central database, other bots. The data may be associated with additional information related to the session. For instance, if the employee intends to know about extension of a leave period, then the bot may request other bots to provide information on eligibility of the employee for having the extended leave. The eligibility may be in terms of any policy allowing extension of the leave period, tenure of the employee in the company, and past leaves taken by the employee. Thereafter, at block 530, the data may be analyzed to determine a solution for the issue. In an example embodiment, the bot may analyze the data and determine the solution to resolve the issue. The solution may include a response to the query of the employee and a suggestion to mitigate the unusual event.

Referring to method 600, at block 605, a profile may be created for a new employee. In one example, the profile generator 125 may generate the profile for the new employee based on a resume and a social media account of the new employee. The information associated with the resume may have been stored in the central database 145 during initial rounds of discussions with the new employee for selection. The information on the social media account may also be available in the central database 145.

At block 610, a goal and an objective may be determined for the new employee. The goal and the objective may include targets in skill sets, knowledge, and experience level that the new employee may have after a certain time period in the enterprise. In an example, the profile generator 125 may determine the goal and the objective for the new employee. At block 615, existing employees may be identified having similar goals and objectives as the new employees. The network analyzer 130 may perform network analysis on existing employee networks to determine the existing employees having similar goals and objectives as the new employee. The network analyzer 130, in one example, may parse the interactions, chats and telephonic conversations between the employees to perform the network analysis.

At block 620, the existing employees may be ranked based on similarity of goals and objectives between the existing employees and the new employee. In an example, the network analyzer 130 may rank the existing employees. The ranking may be performed in a manner that an existing employee with identical or similar goals may be ranked high and the employee with different goals may be ranked low. In an example, existing employees with low ranks may be removed from a list of potential buddies for the new employee. Thereafter, at block 625, a ranked list of existing employees may be identified. In one example, the ranked list of existing employees may be determined by the network analyzer 130. The new employee may approach any of the employees in the ranked list for assistance and guidance related to any issue the new employee may face during on boarding, induction and later on, thereby providing a conducive work environment for growth and productivity of the new employee.

Method 700 is for determining a buddy for the new employee, according to an embodiment of the present disclosure. At block 705, the demographics of the new employee may be identified. The profile generator 125 may determine the demographics of the new employee. Thereafter, at block 710, existing employees having similar profiles and demographics are identified as potential buddies. In an example, the network analyzer 130 may perform employee network analysis to identify the exiting employees having similar profiles and demographics.

At block 715, each potential buddy may be ranked based on the similarity. Thereafter, at block 720, a buddy may be identified from the potential buddies for the new employee. The buddy may assist, guide and familiarize the new employee with work culture, work style and policies of the enterprise for smooth on boarding.

Referring to method 800, at block 805, text is extracted from emails, blogs and other internal communication between the employees. The text may then be classified based on a machine learning model, at block 810. In an example, the machine learning model may be a text classification model where, given a piece of text, the machine learning model can determine the class of text. The machine learning model may be used to classify surrounding text information, based on the word frequencies in the text. Further, the text may be converted into a word vector and classification may be performed accordingly. In an example, the network analyzer 130 may extract the text and classify the text using a machine learning model. For example, the network analyzer may classify the text as one of a skill match for an employee, a HR update, and a weekly update.

At block 815, it is determined if an edge exists between a sender and a receiver. The sender may be the employee who initiated a conversation with another employee that is the receiver. The edge may be for instance a relationship or connection between the sender and the receiver in terms of a common knowledge, a skill set. In one example, the network analyzer 130 may determine the edge between the sender and the receiver. Upon determining the edge, edge weight of the edge is updated at block 820. In an example, the weight of the edge may be determined by the frequency, the topic, and other relevant parameters that can be extracted from the communications. The network analyzer 130 may update the edge weight by adding the edge with weight 1 when the edge exists, otherwise update the edge weight to 1.

Thereafter, at block 825, and the edges with weight less than a threshold value is removed.

The threshold may be determined by a combination of global and local criteria. The global criteria may include, for example, regular communication between manager and employee that is connected to annual, quarterly, or monthly communication policies set by the company. The local criteria may include, for example, those spikes which are based on specific interactions between two employees due to, for example, an audit request. Because the purpose of the network may be to identify a group of people that are connected because of work, the threshold can be used to rule out those communications that are unrelated to forming a social network.

Method 900 is for development of an employee within the company in accordance with an example embodiment of the present disclosure. At block 905, a talent development plan is developed for a new employee. The talent development plan may include a road map to achieve a goal and objective of the new employee. The talent development plan may include weekly or monthly workshops, meetings, discussions and assessment sessions with other employees to aid the new employee achieve the goal and the objective. The development planner 135 may establish the talent development plan of the new employee based on a profile of the new employee and the goal and the objective. The development planner 135 may fetch some information from the buddy of the new employee and other employees in designing the development plan. For instance, courses, skill sets, required to achieve the goal and a quarterly time plan to complete the courses and acquire the skill sets.

At block 910, evaluation data associated with the development of the new employee, a role and a responsibility may be collected. The development planner 135 may collect the evaluation data from the buddy, for instance, a manager, and other employees and the evaluation data may include assessment and feedback of the buddy and the other employees regarding completion of targets of knowledge and skill sets as per the time plan by the new employee. Thereafter, at block 915, gaps may be determined in the development of the new employee based on the time plan and targets set for the new employee and the targets actually achieved by the new employee. The development analyzer 140 may determine the gaps in development of the new employee.

At block 920, the talent development plan may be updated. In an example, the development analyzer 140 may update the talent development plan for the new employee to fit to development pace of the new employee and revise the targets. In an example, the development analyzer 140 may update the talent development plan for the new employee.

Thus, the present disclosure describes efficient techniques of providing holistic assistance and support to the employees. The described techniques proactively detect issues with the employees and provide solution to mitigate the issues, thereby enhancing employee satisfaction and retention.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. An employee concierge system (ECS) comprising:
a processor; and
a memory storing instructions, which when executed by the processor, cause the ECS to:
detect an unusual event associated with an employee, the unusual event being indicative of deviation in one of a routine and behavior of the employee;
determine an issue for the employee when the deviation exceeds a predefined threshold;
receive the issue and initiate a session corresponding to the issue;
　parse the issue to determine a context of the issue;
　select a bot from amongst multiple bots for the issue, wherein each of the multiple bots includes information relating to a solution to address the issue, wherein to select the bot from amongst the multiple bots, the processor is to:
　　send the issue to each of the multiple bots;
　　receive a confidence level from the each of the multiple bots, wherein the confidence level is calibrated for each bot and is indicative of a capability of processing the issue; and
　　determine the bot with the highest confidence level for solving the issue of the employee, wherein the processor is to maintain the session as continuous and uninterrupted for the employee; and
store data from each of the multiple bots and contexts for multiple sessions in a central database,
wherein the selected bot is to:
　collect data from at least one of the central database, and other bots from amongst the multiple bots, the data being associated with the issue, wherein for the collection of data, the processor is further to:
　　determine whether the context matches with a context of a previous session, from amongst the multiple sessions; and
　　restore the previous session, upon the match between the context of the issue and the context of the previous session, for the collection of data;
　analyze the data to determine the solution based on an employee model, wherein the employee model corresponds to data associated with routine and behavior of employees of an enterprise, the solution comprising one of a response to the query and a suggestion to mitigate the unusual event; and
　provide the solution to address the issue.

2. The ECS as claimed in claim 1, wherein to perform network analysis, the processor is further to:
extract text from communication between existing employees;
classify the text based on a machine learning model based on frequencies of words in the text;
determine one or more edges between the existing employees, wherein each edge indicates a relationship between the existing employees;
upon the determination of the one or more edges, assign an edge weight to each of the one or more edges;
update the edge weight based on a set of parameters extracted from the communication between the existing employees; and
remove an edge, among the one or more edges, with an edge weight less than a threshold;
wherein the processor is further to identify existing employees having goals and objectives similar to a goal and objective of a new employee based on the network analysis.

3. The ECS as claimed in claim 1,
wherein the processor is further to:
create a profile for a new employee based on a resume and a social media account of the new employee;
identify a goal and an objective of the new employee;
identify existing employees having goals and objectives similar to the goal and the objective of the new employee based on employee network analysis;
rank the existing employees based on the similarity of goals and objectives of the existing employees with the new employee; and
identify a ranked list of the existing employees for providing guidance and assistance to the new employee.

4. The ECS as claimed in claim 3,
wherein the processor is further to:
identify demographics of the new employee;
identify existing employees having profiles and demographics similar to the new employee, as potential buddies, based on network analysis;
rank each of the potential buddy based on similarity of the profiles and the demographics of the potential buddies with the new employee; and
identify a buddy from the potential buddies based on the rank.

5. The ECS as claimed in claim 1,
wherein the processor is further to:
establish a talent development plan for the new employee based on a role, a responsibility and career information of the new employee;
collect evaluation data on a development, a role and a responsibility for the new employee from the central database, and other employees; and
determine gaps in development of the new employee;
wherein the processor is to update the talent development plan for the new employee based on the gaps.

6. The ECS as claimed in claim 1, wherein the bot analyses the data based on an employee model, wherein the employee model corresponds to data associated with routine and behavior of employees of an enterprise.

7. A method comprising:
detecting an unusual event associated with an employee, the unusual event being indicative of deviation in one of a routine and behavior of the employee;
determining an issue for the employee when the deviation exceeds a predefined threshold;
initiating a session corresponding to the issue;
parsing the issue to determine a context; and
selecting a bot from amongst multiple bots for the issue, wherein each of the multiple bots include information relating to a solution to address the issue, wherein the selecting the bot from amongst the multiple bots comprises:
sending the issue to each of the multiple bots;
receiving a confidence level from the each of the multiple bots, wherein the confidence level is calibrated for each bot and is indicative of a capability of processing the issue; and
determining the bot with the highest confidence level for solving the issue of the session;
collecting data from at least one of a central database and other bots from amongst the multiple bots, the data associated with the issue, wherein the collecting the data comprises:
determining whether the context matches with a context of previous session, from amongst the multiple sessions; and
restoring the previous session, upon the match between the context of the issue and the context of the previous session, for the collection of data;
analyzing the data to determine the solution based on an employee model, wherein the employee model corresponds to data associated with routine and behavior of employees of an enterprise, the solution comprising one of a response to the query and a suggestion to mitigate the unusual event; and
providing the solution to address the issue.

8. The method as claimed in claim 7 further comprising:
creating a profile for a new employee based on a resume and a social media account of the new employee; and
identifying a goal and an objective of the new employee;
identifying existing employees having goals and objectives similar to the goal and the objective of the new employee based on employee network analysis;
ranking the existing employees based on the similarity of goals and objectives of the existing employees with the new employee; and
identifying a ranked list of the existing employees for providing guidance and assistance to the new employee.

9. The method as claimed in claim 8 further comprising:
identifying demographics of the new employee;
identifying existing employees having profiles and demographics similar to the new employee, as potential buddies, based on network analysis;
ranking each of the potential buddy based on similarity of the profiles and the demographics of the potential buddies with the new employee; and
identifying a buddy from the potential buddies based on the rank.

10. The method as claimed in claim 7 further comprising:
establishing a talent development plan for the new employee based on a role, a responsibility and career information of the new employee; and
collecting evaluation data on a development, a role and a responsibility for the new employee from the central database, and other employees;
determining gaps in development of the new employee; and
updating the talent development plan for the new employee.

11. A non-transitory computer readable medium including machine readable instructions that are executable by a processor to:
detect an unusual event associated with an employee, the unusual event being indicative of deviation in one of a routine and behavior of the employee;
determine an issue for the employee when the deviation exceeds a predefined threshold;
initiate a session corresponding to the issue;
parse the issue to determine a context of the issue;
select a bot from amongst multiple bots for the issue, wherein each of the multiple bots include information relating to a solution to address the issue, wherein to select the bot from amongst the multiple bots, the processor is to:
send the issue to each of the multiple bots;
receive a confidence level from the each of the multiple bots, wherein the confidence level is calibrated for each bot and is indicative of a capability of processing the issue; and
determine the bot with the highest confidence level for processing the request of the session;

collect data from at least one of a central database, and other bots from amongst the multiple bots, the data associated with the issue, wherein for the collection of data, the processor is further to:
  determine whether the context matches with a context of a previous session, from amongst the multiple sessions; and
  restore the previous session, upon the match between the context of the issue and the context of the previous session, for the collection of data;
analyze the data to determine the solution based on an employee model, wherein the employee model corresponds to data associated with routine and behavior of employees of an enterprise, the solution comprising one of a response to the query and a suggestion to mitigate the unusual event; and
provide the solution to address the issue.

12. The non-transitory computer readable medium as claimed in claim 11, wherein the processor is to:
  create a profile for a new employee based on a resume and a social media account of the new employee; and
  identify a goals and an objective of the new employee;
  identify existing employees having goals and objectives similar to the goal and the objective of the new employee based on network employee analysis;
  rank the existing employees based on the similarity of goals and objectives of the existing employees with the new employee; and
  identify a ranked list of the existing employees for providing guidance and assistance to the new employee.

13. The non-transitory computer readable medium as claimed in claim 12, wherein the processor is further to:
  identify demographics of the new employee;
  identify existing employees having profiles and demographics similar to the new employee, as potential buddies, based on network analysis;
  rank each of the potential buddy based on similarity of the profiles and the demographics of the potential buddies with the new employee; and
  identify a buddy from the potential buddies based on the rank.

14. The non-transitory computer readable medium as claimed in claim 11, wherein the processor is to:
  establish a talent development plan for the new employee based on a role, a responsibility and career information of the new employee; and
  collect evaluation data on a development, a role and a responsibility for the new employee from the central database, and other employees;
  determine gaps in development of the new employee; and
  update the talent development plan for the new employee.

15. The non-transitory computer readable medium as claimed in claim 11, wherein the processor is further to:
  determine relationship between entities of the issue;
  extract words and terms from the issue;
  apply a linguistic rule to the words and terms; and
  generate a question corresponding to the issue wherein the question is shared with the employee to fetch additional details required to solve the issue.

* * * * *

UNITED STATES PATENT AND TRADEMARK OFFICE
CERTIFICATE OF CORRECTION

PATENT NO. : 11,392,835 B2
APPLICATION NO. : 16/119774
DATED : July 19, 2022
INVENTOR(S) : Chung-Sheng Li et al.

It is certified that error appears in the above-identified patent and that said Letters Patent is hereby corrected as shown below:

In the Claims

At Claim 11, Column 16, Line 62, the phrase "from the each" should instead read "from each"

Signed and Sealed this
Twenty-fifth Day of July, 2023

Katherine Kelly Vidal
*Director of the United States Patent and Trademark Office*